Figure 1:
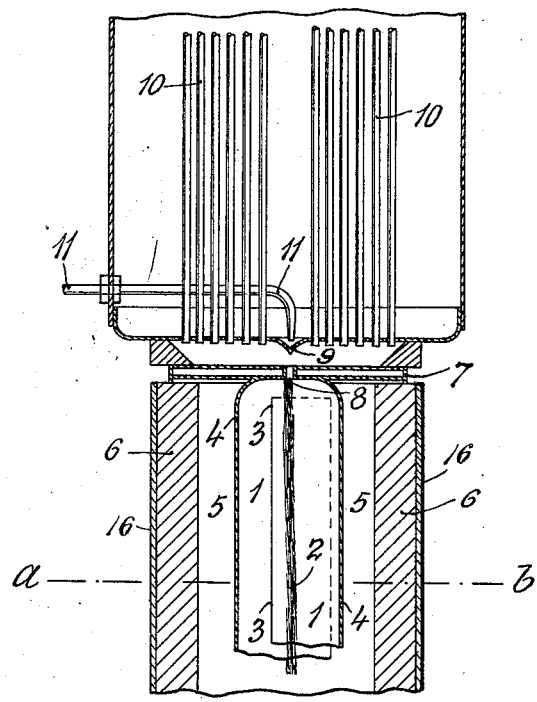

F. H. A. WIELGOLASKI.
PROCESS AND APPARATUS FOR THE ELECTRIC ARC TREATMENT OF GASES.
APPLICATION FILED SEPT. 28, 1916.

1,287,807.

Patented Dec. 17, 1918.

Inventor:
F. H. A. Wielgolaski
by
Attorney

UNITED STATES PATENT OFFICE.

FRANS HENRIK AUBERT WIELGOLASKI, OF CHRISTIANIA, NORWAY.

PROCESS AND APPARATUS FOR THE ELECTRIC-ARC TREATMENT OF GASES.

1,287,807.      Specification of Letters Patent.      Patented Dec. 17, 1918.

Application filed September 28, 1916. Serial No. 122,623.

*To all whom it may concern:*

Be it known that I, FRANS HENRIK AUBERT WIELGOLASKI, a subject of the King of Norway, residing at Odins gate 1, Christiania, in the Kingdom of Norway, have invented certain new and useful Improvements in the Processes and Apparatus for the Electric-Arc Treatment of Gases, of which the following is a specification.

It is a well-known fact that, in reversible gas reactions which are assisted by high temperatures and which therefore are preferably carried out in electric arc furnaces, it is important in the first place to cause the products to leave the furnace with the highest possible temperature, consequently from the arc itself directly, in the second place to cause the quickest possible cooling of the products down to the point at which the product is comparatively stable, and in the third place to cause a sufficiently long duration of action of the electric arc upon the gases.

The present invention has for its object to satisfy all these requirements, which is obtained by the following process and constructional arrangements:

In order to take the gases out from the furnace with the highest possible temperature, the outlet opening is arranged directly at the end of the arc-gap in such a manner, that the end of the arc plays in this opening itself and so that the outlet direction is directed in the longitudinal extension of the arc. In order that the gases may remain for a sufficiently long time under the action of the arc, the flow to the outlet opening should most possibly be compelled to take place along the arc. This is best obtained by causing the gases to whirl around the arc as a consequence of a tangential blowing-in, preferably through a narrow slot on the whole length of the furnace space, or through a row of holes or of short slots, or by causing the gases to approach the arc from all directions in other way, for instance through porous or perforated walls.

In order to obtain the highest possible outflow velocity, I provide for the outflow taking place under a sufficiently large difference in pressure between the inner and outer side of the outflow opening. This difference in pressure may be produced by making the outflow opening sufficiently narrow and by decreasing the pressure outside the outflow opening (by sucking the gases out from the furnace) or by increasing the pressure inside the said opening, viz: within the reaction-space (by forcing the gases into the same under pressure) or by using both methods in combination.

If an increased pressure is used inside the furnace then one is able to increase the said difference in pressure and thereby the outflow velocity of the products quite as desired, which is highly important, because an increase of the gas pressure within the reaction space will highly accelerate the chemical reactions and increase the degree of concentration of the furnace products, see for instance experiments of Rossi, partly reported in: "*Die Technische Ausnutzung des Atmosphärischen Stickstoffes von Eduard Donath und Dr. Karl Frenel*" pages 95-96. This fact is explained partly in this way, that the electric arc on account of increased electric resistance has a much higher temperature in a gas under high pressure than in a gas under ordinary atmospheric pressure, and is partly due to the fact that the production-velocity increases at an increase of the gas pressure whereas the dissociation-velocity decreases. The best method therefore is to use within the furnace space a pressure which is suitably increased according to the circumstances. But even by the use of atmospheric pressure within the furnace space and sucking out the products in the above-indicated manner considerable advantages are obtained above the method hitherto practised.

When thus the gases flow out under an essential decrease in pressure, they on account of their expansion are subjected to a considerable decrease in temperature, which takes place practically at the instant of the reduction of pressure.

This very rapid cooling of the furnace products may be continued by causing the gas jet, just outside the out-blow opening to strike and spread at a great velocity against a comparatively cold metal surface, for instance against the end plate of a steam boiler, through which the gases are thereupon conducted by means of a large number of tubes, which preferably are of a small diameter.

The place, at which the gas jet strikes against the boiler wall, should be cone-shaped, the point of the cone being directed against the center of the gas jet, and the feed water of the boiler should like a jet be directed to the inner side of the said place, or the water within the boiler should by means of a circulation-pump be directed like a strong jet against the said place.

Figure 2:
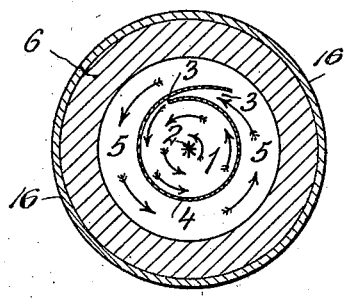

An example of an arrangement which is suitable for carrying out the method described is illustrated in the accompanying drawing, in which Figure 1 is a longitudinal section of such an arrangement and Fig. 2 is a corresponding cross section on the line a—b of Fig. 1.

The electric furnace consists of the tubular furnace space —1—, in the middle axis of which burns the electric arc —2— already quite stretched out. The walls —4— of this furnace space is here constituted by an electrically conducting metal plate, and on the whole length of the furnace space is arranged a very narrow slot —3— passing tangentially through the furnace wall. Around this furnace space proper is arranged an outer space —5—, into which the gases to be treated are blown, for instance under pressure from a compressor. The outer wall of this outer furnace space is formed by a strong mantle 16 adapted to stand the gas-pressure and preferably electrically insulated from the current-conducting parts of the furnace and provided with a heat-insulation lining —6—.

The end wall —7— of the furnace space is hollow and filled with water, and in the middle is introduced a tube —8— having a suitable diameter and forming the narrow outflow opening. The gas in the furnace space —5— passes through the slot —3— like a ribbon-shaped jet into the furnace space —1—. Here this thin gas ribbon first flows along the walls around the arc, around which it is constantly rolled up in approaching the arc, and simultaneously the ribbon is slowly displaced more and more in the longitudinal direction of the arc, and when the gas in this manner has arrived quite within the arc it will, at a great and constantly increasing velocity, follow the longitudinal direction of the arc toward the outflow opening and out through the same with a velocity which is the greater the higher is the difference in pressure between the inner and outer side of the outflow opening.

This violent central outflow in connection with the energetic rotation of the furnace gases within the furnace space will have the result, that only the central gas portions in the furnace space—viz: the gases which are present in the arc itself and which thus are the hottest ones—will obtain a remarkable movement in the longitudinal direction of the arc.

However, in the arc itself and in its longitudinal direction the gases will, as mentioned, flow with a very high velocity toward the outflow opening. Therefore practically only such gases which are very much heated will come to leave the furnace space.

As shown in Fig. 1 the outflowing gas-jet will strike directly against a water-cooled metal surface (an end plate —9— of a steam boiler), which as shown is hollowed out as a cone turning its point against the gas-jet. The hollowed portion of the boiler plate is washed at the inner side by a strong water-jet from the pipe —11—. The gases continue their way and their cooling during their passage through a series of boiler tubes —10— of small diameter. The heat given off is utilized in the boiler for the production of steam.

The same arrangement may be used in connection with double or manifold electric arcs, the same arrangement being used for each separate arc.

Having now described my invention, what I claim as new and desire to secure by Letters Patent is:

1. A process of treating gases by the electric arc and of cooling such gases without allowing any substantial amount of decomposition therein, which comprises establishing and maintaining an elongated arc, lengthwise of a treating chamber and substantially centrally therein, between two electrodes, one of which is hollow and constitutes a restricted outlet for treated gases, introducing the gases to said chamber, throughout substantially the entire length of such chamber, toward substantially the entire length of such arc, whereby said gases are held in contact with the arc for a long time, withdrawing the treated gases through such restricted outlet in a continuous manner to a cooling chamber, and maintaining in such arc chamber a pressure materially higher than in such cooling chamber.

2. In the process of claim 1, the step of tangentially introducing air under superatmospheric pressure into the arc chamber.

3. In the process of claim 1, the steps of directing the gases leaving the arc chamber against a pointed projection on a water-cooled plate, immediately after leaving the restricted outlet of the arc chamber, and projecting a jet of cooling fluid against the opposite side of said plate in close proximity to said projection, whereby the gases are quickly cooled to a temperature at which they are relatively stable.

4. An apparatus for the electric-arc treatment of gases, comprising a long arc chamber provided with a tangential slit-like opening throughout substantially its entire length, the exit of said arc chamber forming one electrode, and the said exit being located opposite to a substantially cone shaped projection on the shell of a steam boiler, against which the said gases are forcibly ejected from said arc chamber, and means for projecting a current of cooling water against the inner concave side of said projection, whereby effective rapid cooling of the gases is effected.

In testimony whereof I have signed my name to this specification in the presence of two subscribing witnesses.

FRANS HENRIK AUBERT WIELGOLASKI.

Witnesses:
AXEL LAHN,
MOGENS BUGGE.